(12) United States Patent
He et al.

(10) Patent No.: US 12,741,751 B2
(45) Date of Patent: Sep. 22, 2026

(54) METHOD AND SYSTEM TO COMPUTE DE-ACCELERATION PERFORMANCE FOR A VTOL AIRCRAFT DURING APPROACH AND LANDING

(71) Applicant: HONEYWELL INTERNATIONAL INC., Charlotte, NC (US)

(72) Inventors: Gang He, Morris Plains, NJ (US); Zuowei He, Shanghai (CN); Ye He, Shanghai (CN); Hao Chen, Shanghai (CN)

(73) Assignee: Honeywell Aerospace US LLC, Phoenix, AZ (US)

( * ) Notice: Subject to any disclaimer, the term of this patent is extended or adjusted under 35 U.S.C. 154(b) by 289 days.

(21) Appl. No.: 18/422,947

(22) Filed: Jan. 25, 2024

(65) Prior Publication Data

US 2025/0242938 A1 Jul. 31, 2025

(51) Int. Cl.
*B64D 45/00* (2006.01)
*B64C 29/00* (2006.01)
(Continued)

(52) U.S. Cl.
CPC .............. *B64D 45/00* (2013.01); *G06T 11/00* (2013.01); *G06T 19/006* (2013.01); *B64C 29/0008* (2013.01)

(58) Field of Classification Search
CPC ....... B64D 45/00; G06T 11/00; G06T 19/006; B64C 29/0008; G01S 13/913; G08G 5/54; G08G 5/55; G01C 23/005
See application file for complete search history.

(56) References Cited

U.S. PATENT DOCUMENTS 7,106,217 B2 * 9/2006 Judge ..................... G05D 1/102
701/14
9,188,978 B2 * 11/2015 Sacle ................... G05D 1/0005
(Continued)

FOREIGN PATENT DOCUMENTS

| | | | | |
|---|---|---|---|---|
| CA | 2521179 C | | 2/2014 | |
| CN | 113879525 A | * | 1/2022 | ............. B64C 27/32 |
| WO | WO-2022015873 A2 | * | 1/2022 | ............. G01S 19/06 |

OTHER PUBLICATIONS

"Hartman, D; Foster, J; Hartman, C; Performance Modeling of Urban Air Mobility Vehicles to Support Air Traffic Management Research; Jan. 19, 2023; American Institute of Aeronautics and Astronautics" (Year: 2023).*
(Continued)

*Primary Examiner* — Ramya P Burgess
*Assistant Examiner* — Christopher R Cardimino
(74) *Attorney, Agent, or Firm* — Ingrassia Fisher & Lorenz LLP

(57) ABSTRACT

A method and system for computing the deceleration performance to a destination point of a vertical takeoff and landing (VTOL) aircraft has been developed. First, predicted performance of the deceleration of the VTOL aircraft is generated and based on pre-determined data for the VTOL aircraft. Sensors of the VTOL aircraft are monitored to capture real-time performance of the deceleration of the VTOL aircraft. A blended display is created of deceleration of the VTOL aircraft by blending the predicted performance and the real-time performance and is shown to the pilot of the VTOL aircraft. The blended display is continuously adjusted by weighting emphasis on the predicted performance based on the degree of correlation to the real-time performance.

17 Claims, 5 Drawing Sheets

(51) Int. Cl.
*G06T 11/00* (2026.01)
*G06T 19/00* (2011.01)

(56) References Cited

U.S. PATENT DOCUMENTS

| | | | | |
|---|---|---|---|---|
| 9,934,692 | B2 | 4/2018 | Lacko et al. | |
| 11,113,978 | B2 | 9/2021 | De Villele et al. | |
| 11,142,337 | B2 | 10/2021 | Lax et al. | |
| 11,587,449 | B2 | 2/2023 | B et al. | |
| 11,598,960 | B1 * | 3/2023 | Auerbach | G06F 3/1423 |
| 11,724,819 | B2 * | 8/2023 | Mckeown | B64D 45/08 701/17 |
| 12,012,210 | B2 * | 6/2024 | Morrison | H04L 12/40 |
| 2009/0292483 | A1 * | 11/2009 | Journade | G08G 5/51 702/33 |
| 2010/0174475 | A1 * | 7/2010 | Estkowski | G01C 23/005 701/120 |
| 2014/0358415 | A1 | 12/2014 | Mcdonald et al. | |
| 2015/0120098 | A1 * | 4/2015 | Catalfamo | G08G 5/54 701/16 |
| 2016/0090193 | A1 * | 3/2016 | He | B64D 45/04 340/971 |
| 2019/0084691 | A1 * | 3/2019 | Pathak | G08G 5/21 |
| 2021/0264798 | A1 * | 8/2021 | B | G08G 5/21 |
| 2022/0100205 | A1 | 3/2022 | Darnell et al. | |
| 2022/0122471 | A1 * | 4/2022 | Maxfield | G08G 5/50 |
| 2023/0027342 | A1 | 1/2023 | Kojima et al. | |

OTHER PUBLICATIONS

"Shamiyeh, M; Rothfeld, R; Hornung, M; a Performance Benchmark of Recent Personal Air Vehicle Concepts for Urban Air Mobility; Sep. 2018; International Council of the Aeronautical Sciences" (Year: 2018).*

* cited by examiner

METHOD AND SYSTEM TO COMPUTE DE-ACCELERATION PERFORMANCE FOR A VTOL AIRCRAFT DURING APPROACH AND LANDING

TECHNICAL FIELD

The present invention generally relates to aircraft avionics, and more particularly relates to a method and system for computing the deceleration performance to a destination point of a vertical takeoff and landing (VTOL) aircraft.

BACKGROUND

Vertical takeoff and landing (VTOL) aircraft use on-board systems to predict aircraft performance when approaching destinations, hover points, etc. The systems typically use real-time data from on-board sensors to calculate and display flight data such as the deceleration performance of the VTOL aircraft. The potential issues of solely using real-time data for predicting the hover stop point are inaccuracies caused by sensor noise and other disturbances during approach operations. The disturbances can be turbulence, wind gusts, etc. which lead to dynamic changes in vehicle performance and the predicted hover point positions. A VTOL aircraft is more prone to these types of disturbances especially when operating at lower speed during approach operations. Hence, there is a need for a method and system for computing the deceleration performance to a destination point of a VTOL aircraft.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for computing the deceleration performance to a destination point of a vertical takeoff and landing (VTOL) aircraft. The method comprises: generating predicted performance of the deceleration of the VTOL aircraft that is based on pre-determined data for the VTOL aircraft; monitoring sensors of the VTOL aircraft to capture real-time performance of the deceleration of the VTOL aircraft; creating a blended display of deceleration of the VTOL aircraft by blending the predicted performance and the real-time performance, where the blended display is shown to a pilot of the VTOL aircraft; and adjusting the blended display of deceleration of the VTOL aircraft by weighting emphasis on the predicted performance based on the degree of correlation to the real-time performance.

A system is provided for computing the deceleration performance to a destination point of a vertical takeoff and landing (VTOL) aircraft. The system comprises: a plurality of sensors that monitor the real-time performance of the VTOL aircraft; a computer system located onboard the VTOL aircraft, where the computer system, generates predicted performance of the deceleration of the VTOL aircraft that is based on pre-determined data for the VTOL aircraft, monitors sensors of the VTOL aircraft to capture real-time performance of the deceleration of the VTOL aircraft, creates a blended display of deceleration of the VTOL aircraft by blending the predicted performance and the real-time performance, where the blended display is shown to a pilot of the VTOL aircraft, and adjusts the blended display of deceleration of the VTOL aircraft by weighting emphasis on the predicted performance based on the degree of correlation to the real-time performance; and a display device located onboard the VTOL aircraft, where the display device shows the blended display to the pilot of the VTOL aircraft.

Furthermore, other desirable features and characteristics of the disclosed embodiments will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for computing the deceleration performance to a destination point of a vertical takeoff and landing (VTOL) aircraft has been developed. First, predicted performance of the deceleration of the VTOL aircraft is generated and based on pre-determined data for the VTOL aircraft. Sensors of the VTOL aircraft are monitored to capture real-time performance of the deceleration of the VTOL aircraft. A blended display is created of deceleration of the VTOL aircraft by blending the predicted performance and the real-time performance and is shown to the pilot of the VTOL aircraft. The blended display is continuously adjusted by weighting emphasis on the predicted performance based on the degree of correlation to the real-time performance.

Figure 1A:
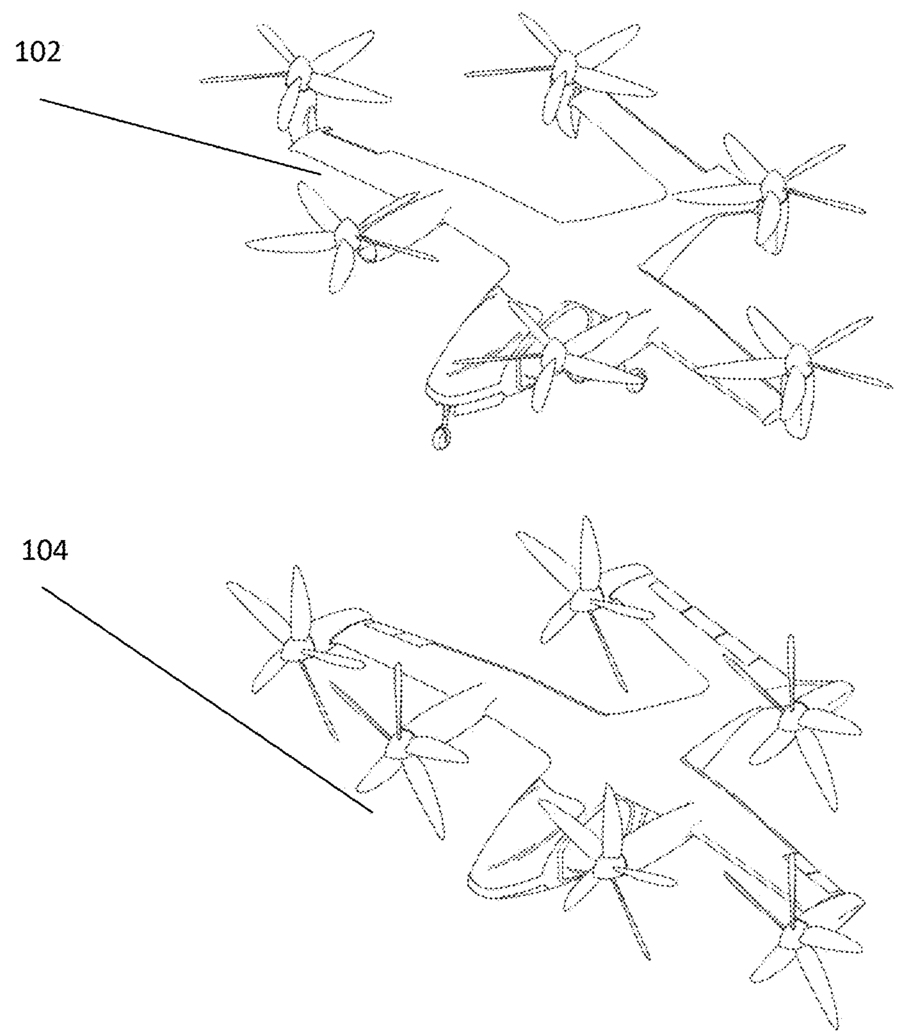
FIG. 1A is a diagram of a vertical takeoff and landing (VTOL) aircraft in accordance with the disclosed embodiments.
Figure 1B:
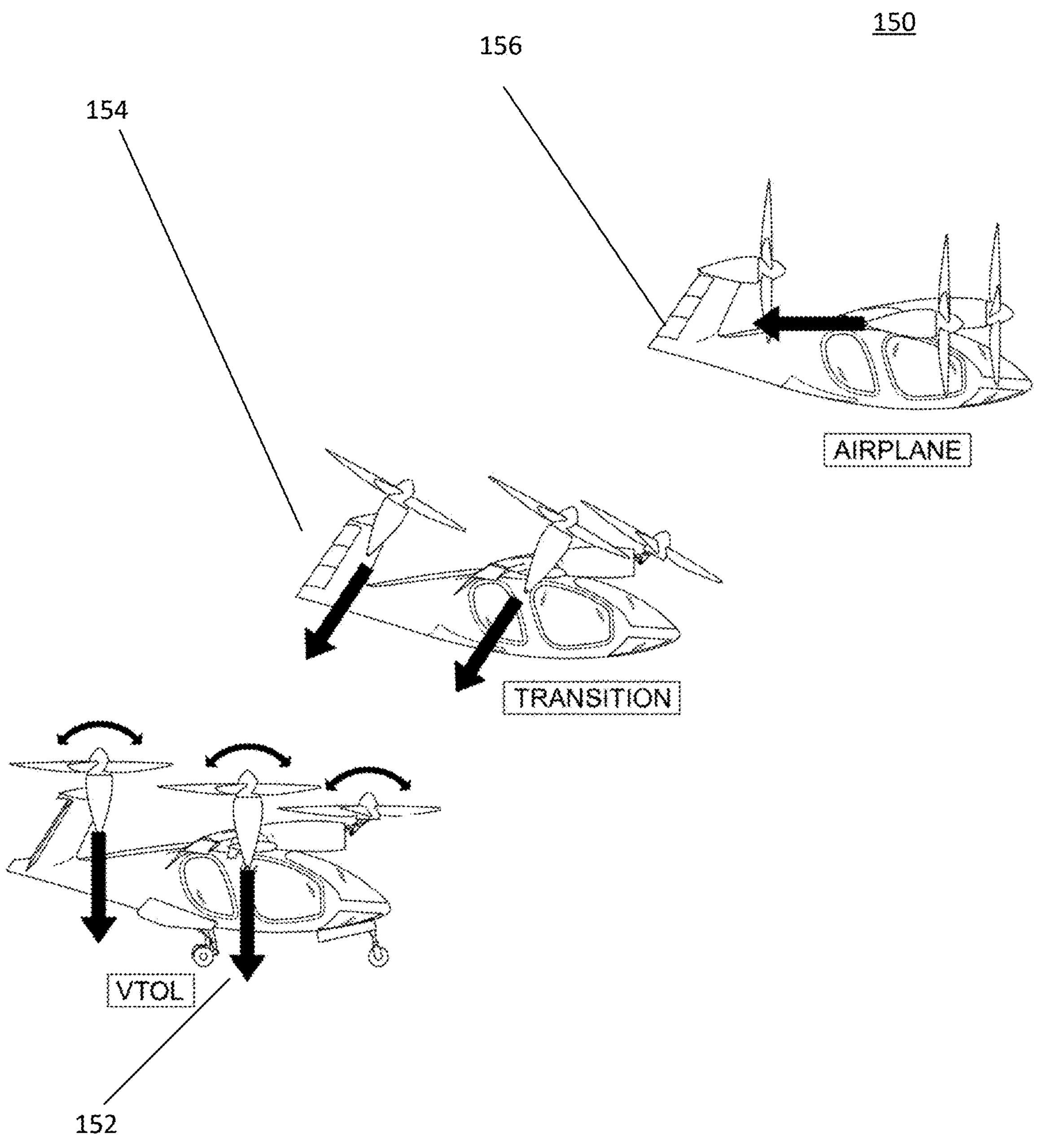
FIG. 1B is a diagram of operational orientations of a VTOL aircraft in accordance with the disclosed embodiments.

Turning now to FIG. 1A, a diagram is shown of a vertical takeoff and landing (VTOL) aircraft 100 in accordance with the disclosed embodiments. This embodiment shows a "tilt rotor" or "tilt engine" aircraft. The aircraft rotors have a vertical orientation when taking off or landing 102 that is similar to a conventional helicopter. The aircraft rotors have a horizontal orientation during flight 104 that is similar to a conventional airplane. FIG. 1B is a diagram of operational orientations of a VTOL aircraft 150 in accordance with the disclosed embodiments. These diagrams show an example of the orientation of the engines of the VTOL aircraft during take-off/landing 152, transitioning to flight 154, and flight 156. While a VTOL is shown in several embodiments, other types of aircraft a conventional helicopter or an electric VTOL (eVTOL) could also utilize the disclosed embodiments.

In other embodiments, the VTOL aircraft may be a urban air mobility (UAM) vehicle. A "UAM" vehicle is small highly automated aircraft to carry passengers or cargo at lower altitudes in urban and suburban areas which has been developed in response to traffic congestion. These aircraft are characterized by the use of multiple electric-powered rotors or fans for lift and propulsion, along with fly-by-wire systems for controls. Most UAM aircraft will be owned and operated by professional operators, such as air taxis.

Figure 2:
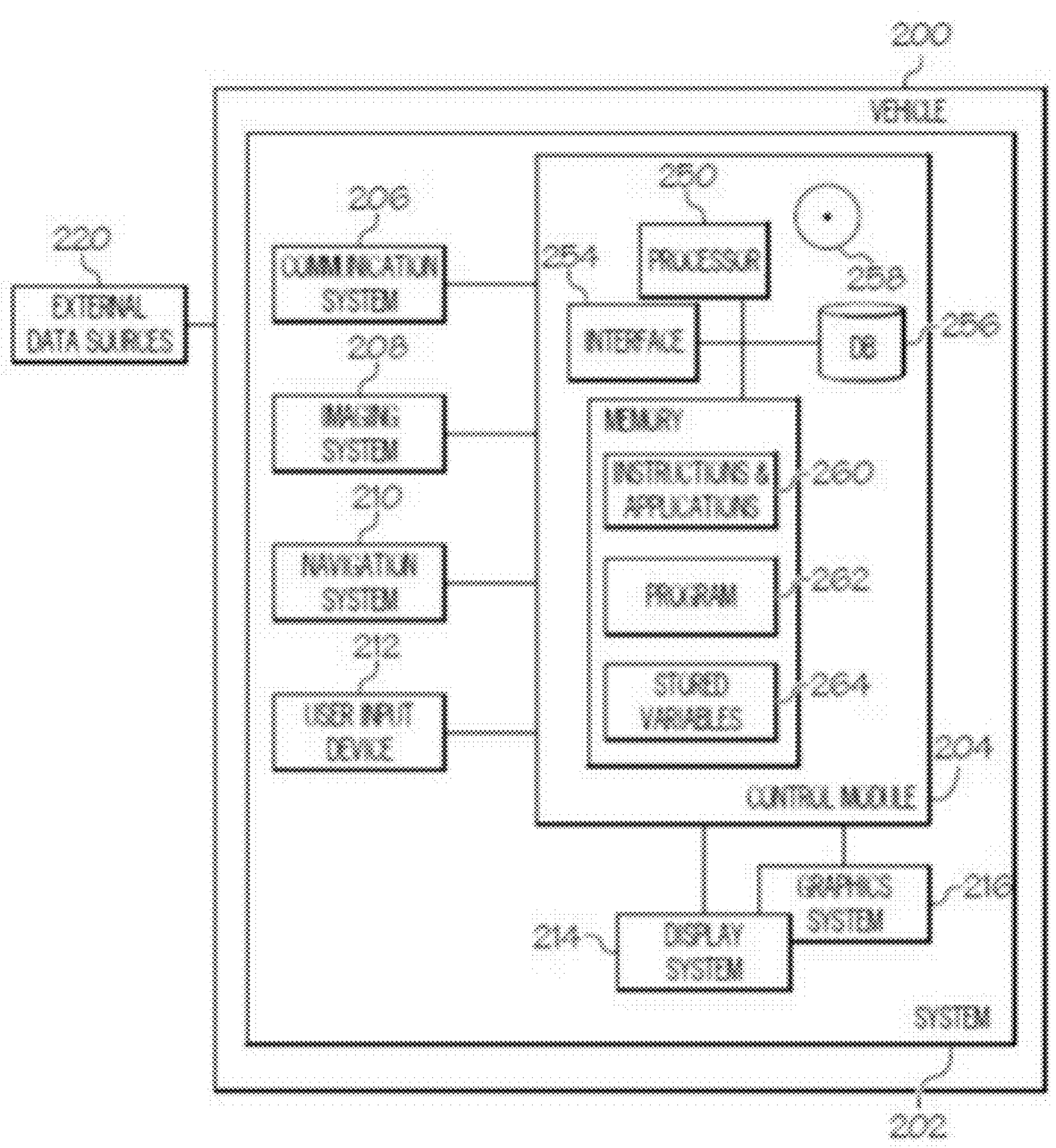
FIG. 2 is a block diagram of a vehicle system that includes a control module that is operationally coupled to a display system in accordance with the disclosed embodiments.

Turning now to FIG. 2, in the depicted embodiment, the vehicle system 202 includes: the control module 204 that is operationally coupled to a communication system 206, an imaging system 208, a navigation system 210, a user input device 212, a display system 214, and a graphics system 216. The operation of these functional blocks is described in more detail below. In the described embodiments, the depicted vehicle system 202 is generally realized as an aircraft flight deck display system within a vehicle 200 that is an aircraft; however, the concepts presented here can be deployed in a variety of mobile platforms, such as land vehicles, spacecraft, watercraft, and the like. Accordingly, in various embodiments, the vehicle system 202 may be associated with or form part of larger aircraft management system, such as a flight management system (FMS).

In the illustrated embodiment, the control module 204 is coupled to the communications system 206, which is configured to support communications between external data source(s) 220 and the aircraft. External source(s) 220 may comprise air traffic control (ATC), or other suitable command centers and ground locations. Data received from the external source(s) 220 includes the instantaneous, or current, visibility report associated with a target landing location or identified runway. In this regard, the communications system 206 may be realized using a radio communication system or another suitable data link system.

The imaging system 208 is configured to use sensing devices to generate video or still images, and provide image data therefrom. The imaging system 208 may comprise one or more sensing devices, such as cameras, each with an associated sensing method. Accordingly, the video or still images generated by the imaging system 208 may be referred to herein as generated images, sensor images, or sensed images, and the image data may be referred to as sensed data. In an embodiment, the imaging system 208 comprises an infrared ("IR") based video camera, low-light TV camera, or a millimeter wave (MMW) video camera. The IR camera senses infrared radiation to create an image in a manner that is similar to an optical camera sensing visible light to create an image. In another embodiment, the imaging system 208 comprises a radar based video camera system. Radar based systems emit pulses of electromagnetic radiation and listen for, or sense, associated return echoes. The radar system may generate an image or video based upon the sensed echoes. In another embodiment, the imaging system 208 may comprise a sonar system. The imaging system 208 uses methods other than visible light to generate images, and the sensing devices within the imaging system 208 are much more sensitive than a human eye. Consequently, the generated images may comprise objects, such as mountains, buildings, or ground objects, that a pilot might not otherwise see due to low visibility conditions.

In various embodiments, the imaging system 208 may be mounted in or near the nose of the aircraft (vehicle 200) and calibrated to align an imaging region with a viewing region of a primary flight display (PFD) or a Head Up display (HUD) rendered on the display system 214. For example, the imaging system 208 may be configured so that a geometric center of its field of view (FOV) is aligned with or otherwise corresponds to the geometric center of the viewing region on the display system 214. In this regard, the imaging system 208 may be oriented or otherwise directed substantially parallel to an anticipated line-of-sight for a pilot and/or crew member in the cockpit of the aircraft to effectively capture a forward looking cockpit view in the respective displayed image. In some embodiments, the displayed images on the display system 214 are three dimensional, and the imaging system 208 generates a synthetic perspective view of terrain in front of the aircraft. The synthetic perspective view of terrain in front of the aircraft is generated to match the direct out-the-window view of a crew member, and may be based on the current position, attitude, and pointing information received from a navigation system 210, or other aircraft and/or flight management systems.

Navigation system 210 is configured to provide real-time navigational data and/or information regarding operation of the aircraft. The navigation system 210 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 210, as will be appreciated in the art. The navigation system 210 is capable of obtaining and/or determining the current or instantaneous position and location information of the aircraft (e.g., the current latitude and longitude) and the current altitude or above ground level for the aircraft. Additionally, in an exemplary embodiment, the navigation system 210 includes inertial reference sensors capable of obtaining or otherwise determining the attitude or orientation (e.g., the pitch, roll, and yaw, heading) of the aircraft relative to earth.

The user input device 212 is coupled to the control module 204, and the user input device 212 and the control module 204 are cooperatively configured to allow a user (e.g., a pilot, co-pilot, or crew member) to interact with the display system 214 and/or other elements of the vehicle system 202 in a conventional manner. The user input device 212 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 212 may be integrated with a display device. Non-limiting examples of uses for the user input device 212 include: entering values for stored variables 264, loading or updating instructions and applications 260, and loading and updating the contents of the database 256, each described in more detail below.

The generated images from the imaging system 208 are provided to the control module 204 in the form of image data. The control module 204 is configured to receive the image data and convert and render the image data into display commands that command and control the renderings of the display system 214. This conversion and rendering may be performed, at least in part, by the graphics system 216. In some embodiments, the graphics system 216 may be integrated within the control module 204; in other embodiments, the graphics system 216 may be integrated within the display system 214. Regardless of the state of integration of these subsystems, responsive to receiving display commands from the control module 204, the display system 214 displays, renders, or otherwise conveys one or more graphical representations or displayed images based on the image data (i.e., sensor based images) and associated with operation of the vehicle 200, as described in greater detail below. In various embodiments, images displayed on the display system 214 may also be responsive to processed user input that was received via a user input device 212.

In general, the display system 214 may include any device or apparatus suitable for displaying flight information or other data associated with operation of the aircraft in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 214 may be part of, or include, a primary flight display (PFD) system, a panel-mounted head down display (HDD), a head up display (HUD), or a head mounted display system, such as a "near to eye display" system. The display system 214 may comprise display devices that provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology.

As mentioned, the control module 204 performs the functions of the vehicle system 202. With continued reference to FIG. 2, within the control module 204, the processor 250 and the memory 252 (having therein the program 262) form a novel processing engine that performs the described processing activities in accordance with the program 262, as is described in more detail below. The control module 204 generates display signals that command and control the display system 214.

The control module 204 includes an interface 254, communicatively coupled to the processor 250 and memory 252 (via a bus 255), database 256, and an optional storage disk 258. In various embodiments, the control module 204 performs actions and other functions in accordance with other embodiments. The processor 250 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 252, the database 256, or a disk 258 maintain data bits and may be utilized by the processor 250 as both storage and a scratch pad. The memory locations where data bits are maintained are physical locations that have particular electrical, magnetic, optical, or organic properties corresponding to the data bits. The memory 252 can be any type of suitable computer readable storage medium. For example, the memory 252 may include various types of dynamic random access memory (DRAM) such as SDRAM, the various types of static RAM (SRAM), and the various types of non-volatile memory (PROM, EPROM, and flash). In certain examples, the memory 252 is located on and/or co-located on the same computer chip as the processor 250. In the depicted embodiment, the memory 252 stores the above-referenced instructions and applications 260 along with one or more configurable variables in stored variables 264. The database 256 and the disk 258 are computer readable storage media in the form of any suitable type of storage apparatus, including direct access storage devices such as hard disk drives, flash systems, floppy disk drives and optical disk drives. The database may include an airport database (comprising airport features) and a terrain database (comprising terrain features). In combination, the features from the airport database and the terrain database are referred to map features. Information in the database 256 may be organized and/or imported from an external source 220 during an initialization step of a process.

The bus 255 serves to transmit programs, data, status and other information or signals between the various components of the control module 204. The bus 255 can be any suitable physical or logical means of connecting computer systems and components. This includes, but is not limited to, direct hard-wired connections, fiber optics, infrared and wireless bus technologies.

The interface 254 enables communications within the control module 204, can include one or more network interfaces to communicate with other systems or components, and can be implemented using any suitable method and apparatus. For example, the interface 254 enables communication from a system driver and/or another computer system. In one embodiment, the interface 254 obtains data from external data source(s) 220 directly. The interface 254 may also include one or more network interfaces to communicate with technicians, and/or one or more storage interfaces to connect to storage apparatuses, such as the database 256.

It will be appreciated that the vehicle system 202 may differ from the embodiment depicted in FIG. 2. As mentioned, the vehicle system 202 can be integrated with an existing flight management system (FMS) or aircraft flight deck display. During operation, the processor 250 loads and executes one or more programs, algorithms and rules embodied as instructions and applications 260 contained within the memory 252 and, as such, controls the general operation of the control module 204 as well as the vehicle system 202. In executing the process described herein, the processor 250 specifically loads and executes the novel program 262. Additionally, the processor 250 is configured to process received inputs (any combination of input from the communication system 206, the imaging system 208, the navigation system 210, and user input provided via user input device 212), reference the database 256 in accordance with the program 262, and generate display commands that command and control the display system 214 based thereon.

Figure 3:
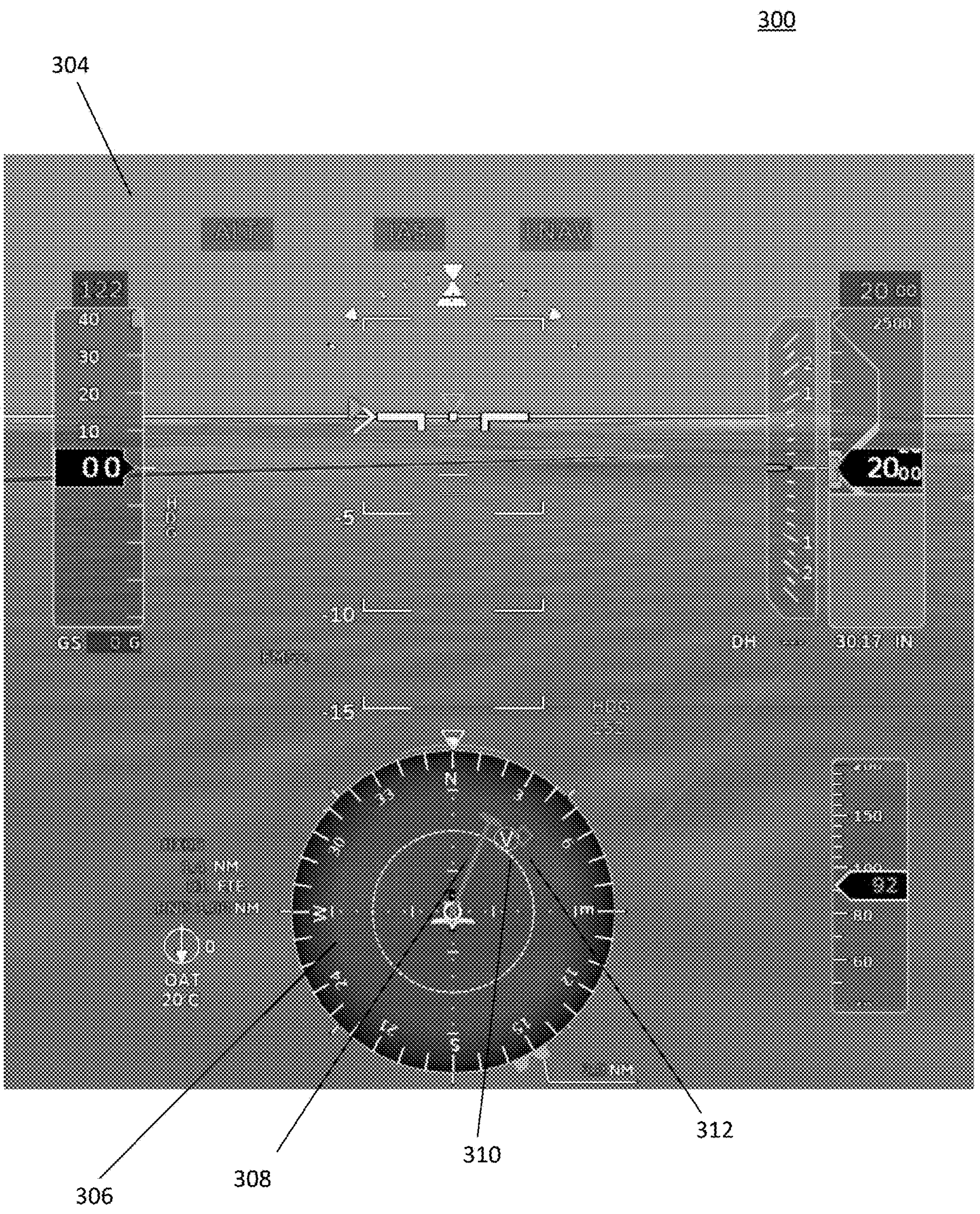
FIG. 3 is a diagram of a flight display for a VTOL aircraft in accordance with the disclosed embodiments.

To simplify VTOL vehicle operations, it is advantageous to construct pilot displays with reduced mental workload, particularly for final approach landing operations. This is especially true for short duration flights and flights in complex urban environments. Turning now to FIG. 3, a diagram 300 is depicted of a flight display 304 with a HSI 308 for a VTOL aircraft in accordance with one embodiment. The hover vector display 306 that is shown for the VTOL approach and landing. operations includes a vector

308 representing both instantaneous approach direction and predicted hover point with zero ground speed relative to an intended hover and landing position 310. An instantaneous position change symbol 312 is shown that indicates a shift in the commanded hover position relative to the intended hover/landing position 310. The position change symbol 312 indicates any change due to unexpected disturbance such as sudden wind shift, etc.

In the example of the hover vector display 306 shown in FIG. 3, the instantaneous approach vector 308 is calculated based on the speed/acceleration/turn rate of the VTOL aircraft. The vector 308 is indicated by a "T" shaped symbol. The intended landing point 310 marked as V symbol in HSI area 306 while diamond symbol 312 indicates the positional change relative to the intended landing point. During the flight, the pilot sees the current hover point 312 is slightly off the intended hover point 310. When aircraft is experiencing sudden cross wind during the approach, the instantaneous projected position may be off as indicated, allowing pilot to enact changes to bring the aircraft back onto the vector path to the intended hover point 310. The goal of the pilot is to correlate the approach vector 308, the current hover point 312 and the intended hover point 310 to the same point on the HSI 306. A range indication is shown at the bottom of the HSI display (2 NM), indicating the landing point V is at slightly more than 1 NM position relative to the current aircraft position. When the landing point is closer or further out, the HSI display range may be adjusted by pilot or automatically in order to keep the landing point and hover vector display inside the HSI area.

It should be understood that the HSI display 306 can be shown as a hover display, a top-down view display, a two-dimensional (2D) perspective display and a three-dimensional (3D) perspective display as desired. Also, the VTOL aircraft may be an urban air mobility (UAM) vehicle, a helicopter or other vertical take off and landing aircraft as desired.

When predicting a UAM hover point with zero ground speed, real time measured ground speed and deceleration may be used to predict the stop point along the direction or the defined path of travel. When the predicted stop point is overlaid onto a display (either 2D or 3D) with the intended point of landing, an aircraft pilot may use the positional differences of the predicted landing point to the intended landing point to adjust vehicle performance such that the predicted and intended landing point overlap and the vehicle will reach zero speed hover at the intended landing point.

The potential issues of relying solely real-time measured deceleration and speed for predicting the hover stop point are sensitivities caused by sensor noises and by random disturbances during approach operations. The disturbances may be turbulence, wind gusts, weather, etc. which lead to dynamic changes in the vehicle performance and subsequently affect the predicted hover point position. A lightweight aircraft such as a UAM aircraft is more prone to suffer the adverse effect to these types of disturbances. This is particularly true when operating at lower speeds during approach operations.

These types of dynamic behavior may cause difficulties for aircraft pilot to control the landing point. Additionally, signal filtering may lead to latency and pilot induced oscillation issues. When deceleration performance is entirely based on a predetermined or fixed set of aircraft performance parameters, it may not be accurate when actual aircraft performance deviates from the fixed set of performance numbers. This type of deviation is more likely to happen for light air vehicles operating in lower speed domains.

To ensure both accuracy and usability of the predicted landing distance for approach to hover operations, an adaptive approach is used in accordance with some embodiments of the present disclosure. The approach includes blending (1) predicted performance data of the deceleration of the VTOL aircraft with (2) real-time performance of the deceleration of the VTOL aircraft. The predicted performance data is based on pre-determined performance numbers and data for the VTOL aircraft. The real-time performance is based on measured speed and deceleration of the VTOL aircraft.

The predicted performance data and the real-time performance data are weighted during the blending. The weight of each of the signals is determined by filtering the differences between real-time measured signals to the pre-determined performance numbers. When the real-time measured performance numbers are close (using a predetermined margin of similarity) to the pre-determined performance numbers and data, the weight of the predicted performance data is increased. This provides a greater influence of the predicted performance data on the blended display of the VTOL deceleration and computed landing distance. This allows the blended display to be more predictable and stable.

In some embodiments, the pre-determined performance numbers and data may include preset performance values as well as captured performance values immediately prior to approach operations. The captured performance values are used to minimize latency. For example, the captured speed for the vehicle at the start of deceleration process may be used to predict forward the required deceleration performance in order to stop at the desired hover point. When the aircraft is controlled by pilot or by an autopilot with the intent to achieve zero ground speed at the hover point, the required deceleration as captured can be used to counter balance latency introduced by signal filtering for real-time signals. These computational approaches to minimizing latency maybe implemented in the display software. In some embodiments, the captured performance values are used to minimize any signal latency of greater than 1 second. In alternative embodiments, a pilot may manually shut off the latency minimization function or the blending of signals in their entirety. It should be clear that the advantages of the disclosed embodiments generate a smoothed display of the deceleration performance of a VTOL aircraft. This helps prevent a pilot from overreacting to various flight conditions and inducing oscillation of the aircraft.

Figure 4:
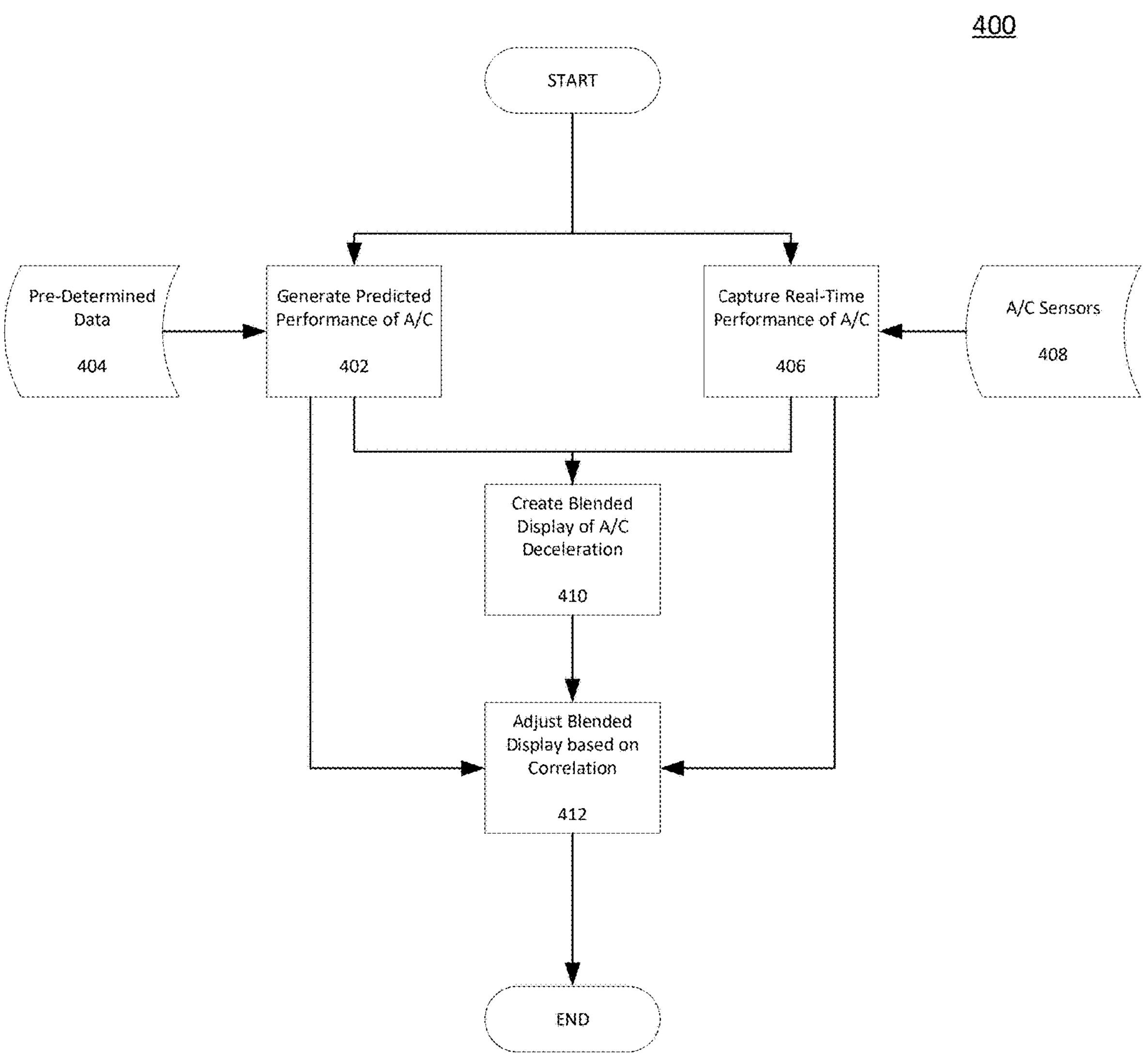
FIG. 4 is a flowchart of a method for computing the deceleration performance to a destination point of a VTOL aircraft in accordance with the disclosed embodiments.

Turing now to FIG. 4, a flowchart 400 is shown of a method for computing the deceleration performance to a destination point of a VTOL aircraft in accordance with the disclosed embodiments. First, predicted performance of the deceleration of the VTOL aircraft is generated 402 that is based on pre-determined data for the VTOL aircraft 404. Sensors of the VTOL aircraft 408 are monitored to capture real-time performance of the deceleration of the VTOL aircraft 406. A blended display 410 is created of deceleration of the VTOL aircraft by blending the predicted performance 402 and the real-time performance 406 and is shown to the pilot of the VTOL aircraft. The blended display is continuously adjusted 412 by weighting emphasis on the predicted performance 402 based on the degree of correlation to the real-time performance 406.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as “first,” “second,” “third,” etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as “connect” or “coupled to” used in describing a relationship between different elements do not imply that a direct physical connection must be made between these elements. For example, two elements may be connected to each other physically, electronically, logically, or in any other manner, through one or more additional elements.

As used herein, the term “axial” refers to a direction that is generally parallel to or coincident with an axis of rotation, axis of symmetry, or centerline of a component or components. For example, in a cylinder or disc with a centerline and generally circular ends or opposing faces, the “axial” direction may refer to the direction that generally extends in parallel to the centerline between the opposite ends or faces. In certain instances, the term “axial” may be utilized with respect to components that are not cylindrical (or otherwise radially symmetric). For example, the “axial” direction for a rectangular housing containing a rotating shaft may be viewed as a direction that is generally parallel to or coincident with the rotational axis of the shaft. Furthermore, the term “radially” as used herein may refer to a direction or a relationship of components with respect to a line extending outward from a shared centerline, axis, or similar reference, for example in a plane of a cylinder or disc that is perpendicular to the centerline or axis. In certain instances, components may be viewed as “radially” aligned even though one or both of the components may not be cylindrical (or otherwise radially symmetric). Furthermore, the terms “axial” and “radial” (and any derivatives) may encompass directional relationships that are other than precisely aligned with (e.g., oblique to) the true axial and radial dimensions, provided the relationship is predominantly in the respective nominal axial or radial direction. As used herein, the term “substantially” denotes within 5% to account for manufacturing tolerances. Also, as used herein, the term “about” denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of flying a vertical takeoff and landing (VTOL) aircraft, comprising:

automatically generating, by at least one processor on the VTOL aircraft as operations of a flight management system (FMS), predicted performance of the deceleration of the VTOL aircraft as the aircraft approaches an intended hover position destination and that includes extracting pre-determined predicted performance data for the VTOL aircraft;

automatically retrieving, by the at least one processor, monitoring sensors data of the VTOL aircraft that includes captured real-time performance data of the deceleration of the VTOL aircraft;

creating, by the at least one processor, a blended display of deceleration of the VTOL aircraft on a display device on a flight deck of the VTOL aircraft and by blending the predicted performance data and the real-time performance data, wherein the blending, by the at least one processor, comprises continuously adjusting the blended display of deceleration of the VTOL aircraft by continuously adjusting a location of the intended hover position destination to direct pilot control inputs affecting aircraft operation and depending on a correlation of predicted performance data to real-time performance data, wherein the correlation includes automatically filtering a difference between the predicted performance data and the real-time performance data so that when the difference is within a predetermined margin of similarity, weights of the predicted performance data is increased;

automatically adjusting data of the blended display of deceleration of the VTOL aircraft by adjusting the location of the intended hover position destination depending on results of the blending; and automatically flying the VTOL aircraft, by an autopilot of the VTOL aircraft, along the adjusted approach vector toward the adjusted location of the intended hover position destination in response to the adjustment of the data of the blended display.

2. The method of claim 1, where the VTOL aircraft comprises an urban air mobility (UAM) aircraft.

3. The method of claim 1, where the VTOL aircraft comprises a helicopter.

4. The method of claim 1, where the predicted performance is additionally based on captured predicted performance data of the VTOL aircraft immediately prior to approach operations to the destination point.

5. The method of claim 1, where the captured real-time performance data of the deceleration of the VTOL aircraft includes the effects of signal noise from the sensors.

6. The method of claim 1, where the captured real-time performance data of the deceleration of the VTOL aircraft includes the effects of turbulence.

7. The method of claim 1, where the captured real-time performance data of the deceleration of the VTOL aircraft includes the effects of weather.

8. The method of claim 1, where the captured real-time performance data of the deceleration of the VTOL aircraft compensates for potential signal latency.

9. The method of claim 1, where the blended display is three-dimensional (3D).

10. The method of claim 1, where the blended display is two-dimensional (2D).

11. A computer-implemented system, comprising:

a vertical takeoff and landing (VTOL) aircraft having a plurality of sensors that monitor real-time performance of the VTOL aircraft;

a display device on a flight deck of the VTOL aircraft;

an automatic pilot arranged to fly the VTOL aircraft when not being flown manually by a pilot on the VTOL aircraft;

at least one processor onboard the VTOL aircraft communicatively coupled to the plurality of sensors, the display device, and the automatic pilot, and wherein the at least one processor operates a flight management system (FMS) so that the FMS:

automatically generates predicted performance of the deceleration of the VTOL aircraft as the aircraft approaches an intended hover position destination and that is based on pre-determined predicted performance data for the VTOL aircraft, automatically retrieves monitoring sensors data of the VTOL aircraft that includes captured real-time performance data of the deceleration of the VTOL aircraft, creating a blended display of deceleration of the VTOL aircraft on the display device and by blending the predicted performance data and the real-time performance data, wherein the blending, by the at least one processor, comprises continuously adjusting the blended display of deceleration of the VTOL aircraft by adjusting a location of the intended hover position destination to direct pilot control inputs affecting aircraft operation and depending on a correlation of predicted performance data to real-time performance data, wherein the correlation includes automatically filtering a difference between the predicted performance data and the real-time performance data so that when the difference is within a predetermined margin of similarity, weights of the predicted performance data is increased;

automatically flying the VTOL aircraft, by the autopilot, along the adjusted approach vector toward the adjusted location of the intended hover position destination in response to the adjustment of the data of the blended display.

12. The system of claim 11, where the VTOL aircraft comprises an urban air mobility (UAM) aircraft.

13. The system of claim 11, where the VTOL aircraft comprises a helicopter.

14. The system of claim 11, where the predicted performance is additionally based on captured predicted performance data of the VTOL aircraft immediately prior to approach operations to the destination point.

15. The system of claim 11, where the captured real-time performance data of the deceleration of the VTOL aircraft includes the effects of signal noise from the sensors.

16. The system of claim 11, where the captured real-time performance data of the deceleration of the VTOL aircraft includes the effects of turbulence.

17. The system of claim 11, where the captured real-time performance data of the deceleration of the VTOL aircraft includes the effects of weather.

* * * * *